United States Patent [19]

Williams

[11] Patent Number: 5,099,584

[45] Date of Patent: Mar. 31, 1992

[54] SELF WIPING DIPSTICK

[76] Inventor: John H. Williams, 518 Martin La., Augusta, Ga. 30909

[21] Appl. No.: 608,678

[22] Filed: Nov. 5, 1990

[51] Int. Cl.⁵ .................... G01F 23/04; F01M 11/12
[52] U.S. Cl. ...................................... 33/725; 33/722; 33/728; 33/730; 15/210 B
[58] Field of Search .............. 33/725, 730, 728, 724, 33/729, 722, 726, 723, 727, 731; 15/210 B; 116/109, 227; 340/450, 450.1, 450.3

[56] References Cited

U.S. PATENT DOCUMENTS

| 1,658,774 | 2/1928 | Taub | 33/729 |
| 3,296,703 | 1/1967 | Stade et al. | 33/731 |
| 3,591,886 | 7/1971 | Denver | 15/210 B |
| 3,703,038 | 11/1972 | Smith | 33/725 |
| 4,110,909 | 9/1978 | Mayr et al. | 33/725 |
| 4,422,204 | 12/1983 | Long, Jr. | 15/210 B |
| 4,558,520 | 12/1985 | Forde, Jr. | 33/725 |
| 4,761,886 | 8/1988 | Wilson | 33/722 |
| 4,780,925 | 11/1988 | Sherman | 15/210 B |
| 4,942,669 | 7/1990 | Schnedl | 33/725 |
| 4,965,942 | 10/1990 | Hoszowski | 33/731 |

Primary Examiner—William A. Cuchlinski, Jr.
Assistant Examiner—William C. Dowling

[57] ABSTRACT

A dipstick is suspended from a pivoting mount in the center of a cap. When performing a fluid level check, this cap is loosened from a wiper plug, which remains stationary in its tube housing as the dipstick is withdrawn through it. A series of internal wipers clean the dipstick as it passes through the wiper plug. Wiped fluids return to the fluid reservoir via undercuts in the individual wiper blades. The clean dipstick is then reinserted into the wiper plug to full depth, and the cap retightened on the wiper plug. The cap, dipstick, and wiper plug are then withdrawn together by pulling upwards from their tube housing. The actual fluid level in the reservoir will now show on the dipstick.

4 Claims, 2 Drawing Sheets

SELF WIPING DIPSTICK

BACKGROUND OF THE INVENTION

1. Field of the Invention

This invention relates in general to internal combustion engines, and in particular to any engine or device which utilizes a dipstick to verify fluid reservoir levels.

2. Prior Art

Checking the fluid levels in an internal combustion engine is an essential part of regular preventive maintenance. Incorrect levels, both above and below optimum, can shorten the useful life of an engine dramatically. Due to its simplicity and accuracy, the dipstick remains in wide use to verify such fluid levels. By its nature, however, the dipstick must be wiped clean with another material before a fluid level check can be performed. Prior attempts to develop a self wiping mechanism for the dipstick have resulted in cumbersome, overly elaborate, or inconvenient devices. Although each of these devices satisfies the desired function of wiping the dipstick, none to date equalls the compact, maintenance free convenience of the present invention.

U.S. Pat. No. 4,233,704 to Sartorio describes several variations of a dipstick cleaning device, both attatched to the dipstick entrance tube, and mounted remotely elsewhere. Designs shown are elaborate, and are therefore costly to produce and difficult for the novice to operate. All designs shown incorporate absorbent pads, which, when saturated, would require periodic cleanings or replacement. Such pads would also be prone to collect road debris and grime. One version employs a separate collection tank for wiped fluids, which must be drained when the tank nears its capacity. This further complicates an already complex device by adding another required maintenance step.

U.S. Pat. Nos. 4,422,204 and 4,506,402 to Long, Jr. describe a dipstick cleaning device which mounts directly to the dipstick entrance tube. Like the Sartorio device, this device employs absorbent pads which must be periodically cleaned or replaced. It too is mechanically elaborate, and would therefore be costly to produce and difficult for the novice to operate. As shown, this device requires the user to use both hands; one to pull out the dipstick, and one to pinch the wiper pads together for the cleaning sequence. As will be shown for the present invention, such additional steps are incovenient and unnecessary.

U.S. Pat. No. 4,658,462 to Elassar describes a remotely mounted dipstick cleaning unit. When mounted somewhere in the engine compartment, this device does offer a means of wiping the dipstick without a separate wiping material. Like the Sartorio and Long, Jr. devices, however, this device requires periodic maintenance in of itself. Fluids removed by the device's opposing wipers accumulate inside the unit, and must be drained as the unit nears capacity. Like the Long, Jr. device, this unit requires two handed operation. Also, given the complexity of late model engine compartments, the question of where to mount a remote unit becomes inescapable.

U.S. Pat. No. 4,780,925 to Sherman depicts an automatic dipstick wiping device which mounts directly onto the dipstick entrance tube. It employs a single block of wiping material, such as foam rubber, which acts to clean one side of the dipstick as the dipstick is withdrawn from the tube. By cleaning only one side of the dipstick, this device invites human error into the fluid level check. As pictured, this block is mounted in an exposed position, where dirt and contaminants are sure to accumulate. Although less elaborate than the previously cited devices, this device could also prove harmful to the engine, if dirt and contaminants find their way down from the wiper block to the tube and reservoir below.

U.S. Pat. No. 4,860,401 to Deveaux offers a workable solution to the dipstick cleaning problem. With this device, a fixed stopper encloses the upper end of the dipstick entrance tube. Two slit apertures open through the stopper to allow the dipstick access to the fluid reservoir below. One of the apertures is large enough to allow the dipstick to pass through without being wiped clean. The other is small enough to wipe the dipstick clean as it passes through. Wiped fluids return to the entrance tube and reservoir, and there are no absorbent pads to clean or replace. The chief drawback of this device is that it requires the user to discern between the two slit apertures. Especially in a dark or dimly lit engine compartment, this action would become difficult at best. Also, in order for the dipstick-mounted cap to close over the device with the dipstick inserted in either aperture, the inner cap diameter must be substantially greater than the outside diameter of the stopper. This loose fit of the cap would encourage road grime and contaminants to enter the device, and ultimately the reservoir below. Although simple in design, the Deveaux device is both inconvenient to use, and potentially harmful to the engine it serves.

SUMMARY OF THE INVENTION

The present invention aims to accomplish the desired function of wiping a dipstick, without the use of a separate wiping material, and without the cumbersome, elaborate qualities of the prior art. It is a further aim of the present invention to provide a device which allows simple one handed operation, is maintenance free, and is inexpensive to produce. Said device must not encourage harmful contaminants to enter the engine or system which it serves.

The preferred invention includes a tube housing, a wiper plug, and a cap/dipstick assembly. The tube housing projects from the fluid reservoir area and opens upward to receive the wiper plug. Ribs on the outer surface of the wiper plug hold it in the tube housing at an exact depth determined by the wiper plug shoulder. The portion of the wiper plug which inserts into the tube housing is oval in cross section, and thus the tube housing end must be shaped accordingly. Inside of the wiper plug are a series of wipers, molded integrally into the plug, through which the dipstick must pass. They are angled downward and undercut to allow for wiped fluid to return to the reservoir below via the tube housing. The dipstick is attatched to the underside of the cap by a center pivot. This pivot, combined with the oval cross section of the wiper plug, enables the cap to be turned independently of the wiper plug when the dipstick is fully inserted. The cap engages the wiper plug by means of a short screw thread. To perform a fluid level check, one loosens the cap, disengaging the wiper plug, and proceeds to draw the dipstick out through the wiper plug. This sequence wipes clean the dipstick, and returns the wiped fluid to the reservoir. The dipstick is then reinserted through the wiper plug, and the cap retightened. Wiper plug and cap are then withdrawn together from the tube housing to reveal the correct fluid level on the dipstick.

DETAILED DESCRIPTION OF THE PREFERRED EMBODIMENTS

As shown on the drawings, the preferred invention design incorporates three items or item assemblies. The first of these, the tube housing, shown as item 9 in FIG. 3, is fixed to the engine block or other device in which fluid levels are to be checked. This tube directs the dipstick downward into the surface of the fluid to a predetermined depth. At this depth, the wiper plug shoulder, item 4 in FIG. 2, abuts the upper end of said tube, preventing further penetration. The upper neck of the tube is oval in cross section, to receive the wiper plug. This oval cross section gradually tapers to a round cross section just below the tip of the inserted plug. An expanded portion of the neck enables the wiper plug ribs, item 5 in FIG. 2, to grip the sides of the tube when the plug is fully inserted. As pictured, the tube can be made of metal, but other materials such as ceramics, plastics, or other synthetic material may also prove suitable. If molded integrally into the engine block or other device served, the externally affixed tube may be eliminated altogether.

Figure 1:
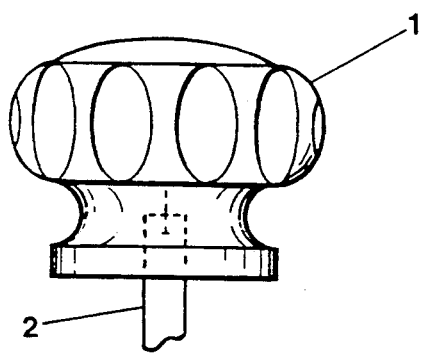
FIG. 1 shows the cap/dipstick assembly according to the present invention in elevation.
Figure 1A:
FIG. 1A shows the cap/dipstick assembly of FIG. 1 in plan view.
Figure 2:
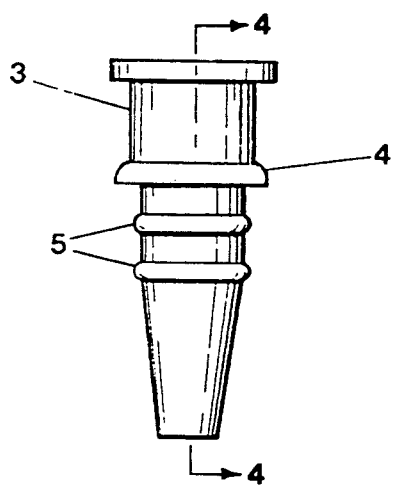
FIG. 2 shows the wiper plug according to the present invention in elevation.
Figure 2A:
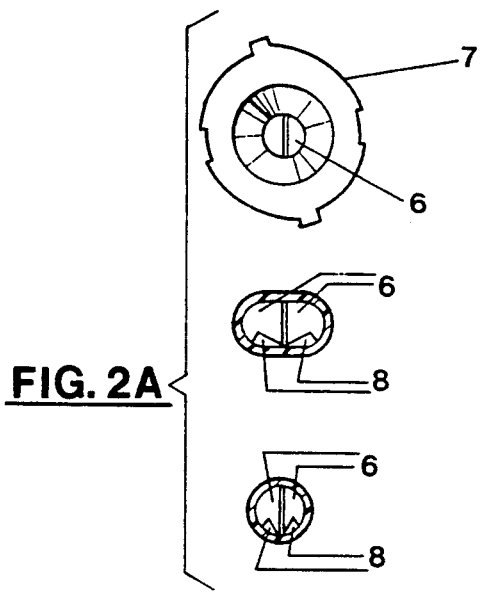
FIG. 2A shows the wiper plug of FIG. 2 in three sectional views.
Figure 3:
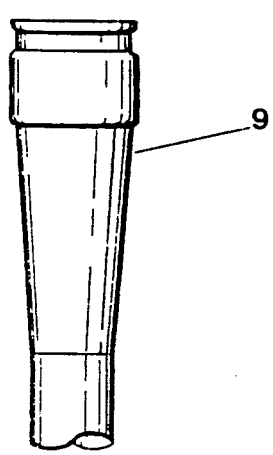
FIG. 3 shows the tube housing according to the present invention in elevation.
Figure 3A:
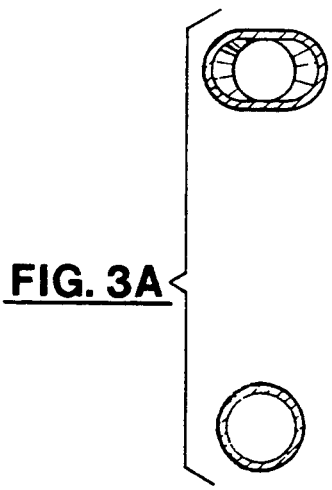
FIG. 3A shows the tube housing of FIG. 3 in two sectional views.
Figure 4:
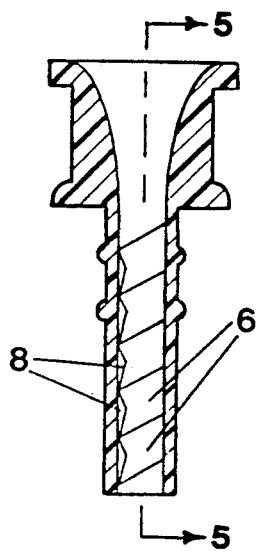
FIG. 4 shows another sectional view of the wiper plug of FIG. 2.
Figure 5:
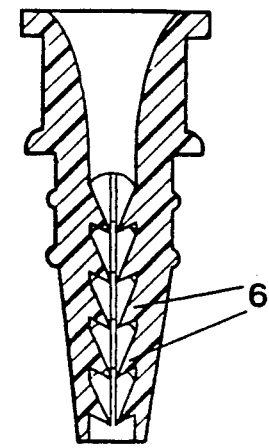
FIG. 5 shows still another sectional view of the wiper plug of FIG. 4, rotated ninety degrees along its longitudinal axis.

The wiper plug, pictured as item 3 in FIG. 2, is molded of a semi-rigid vinyl or rubber material, which will resist long term exposure to the fluid and/or temperature extremes. Its ribs (item 5, FIG. 2) must fit snugly into the neck of the tube housing to prevent unintentional removal by the dipstick (item 2, FIG. 1) during the wiping sequence. They must not fit so tightly that intentional removal of the wiper plug during the actual fluid level check becomes difficult. The material used to make the wiper plug must be capable of maintaining this precise fit under varying operating conditions. It must be rigid and durable enough to accept the threaded cap assembly, shown in FIG. 1. The threaded area of the plug is shown as item 7 in FIG. 2. In use, the wiper plug's integrally molded wipers (item 6, FIG'S. 2,4,5) clean the dipstick and return the wiped fluid to the tube housing via undercuts in the individual wipers (item 8, FIG'S. 2,4) This undercutting of the wipers permits oil drainage while maintaining full contact of the wiper blades on the dipstick passing through. The wiper blades are also angled downward, as shown in FIG. 4, to increase their surface contact area and encourage gravity drainage.

Figure 6:
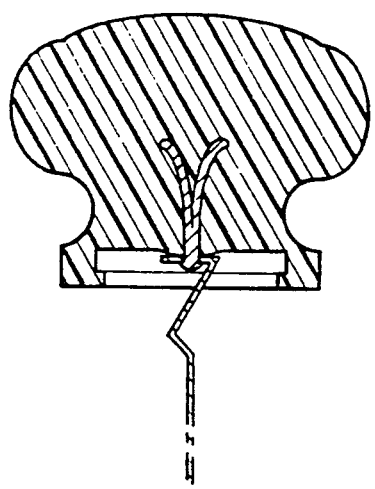
FIG. 6 shows a sectional view of the cap/dipstick assembly of FIG. 1.

The cap/dipstick assembly, shown in FIG. 1, comprises the third component of the invention. As pictured, the knob like shape of the cap (item 1, FIG. 1) enables the user to easily grip the cap for both turning and pulling actions. Because the dipstick (item 2, FIG. 1) is mounted on a pivoting center under the cap, turning the cap does not exert torque on the wiper plug. FIG. 6 depicts one version of the pivoting dipstick mount. The wiper plug remains stationary due to its oval cross section, thereby permitting the cap to be engaged or disengaged as required. As shown in FIG. 1, markings may be included on the cap to designate which direction to turn the cap for cleaning the dipstick or checking the fluid level. The preferred material for the cap is a hard plastic or other synthetic material which will resist long term exposure to the fluid and/or temperature extremes. Especially in high heat applications, thermal conductivity of said material should be low, to prevent users of the device from being burned. The dipstick itself can be made in traditional fashion, of stainless steel or other suitable material, as conditions permit.

The preferred invention accomplishes the desired functions of a self wiping dipstick device. Wiped fluids return to the fluid reservoir, so that no separate wiping material is necessary. The device is simple for the novice to operate, and this simplicity translates directly into cost effective manufacture. Its design is compact and durable, and allows for clean, convenient, one handed operation.

The preceeding description of the preferred invention is intended for illustrative purposes only. Modifications to, and variations on, the preferred design are possible. The above description is not intended to limit the scope of the invention, or that of its potential modifications and variations.

I claim:

1. A self wiping dipstick device, for use in verifying fluid reservoir levels, which requires no separate wiping material, the preferred design of which is comprised by: a fixed tube housing extending from a fluid reservoir area upwards to receive and direct the dipstick assembly which will pass into and through it; a wiper plug, which inserts into said fixed tube housing with such cross section as to resist twisting actions, with integrally molded internal wipers and fluid drain passages to wipe clean the dipstick and return wiped fluid to the tube housing and fluid reservoir below; and a cap/dipstick assembly, which engages said wiper plug by means of a short screw thread, and whose construction is such that the dipstick is suspended from the center of the underside of the cap by means of a pivot, enabling the user to engage or disengage the cap without exerting torque on either the wiper plug or the dipstick inserted within it.

2. An improved dipstick device, which requires no separate wiping material, for use in verifying fluid reservoir levels, wherein the improvement comprises the addition of: a specially designed fixed tube housing, extending from a fluid reservoir area upwards to receive and direct the dipstick assembly which will pass into and through it; a wiper plug, which inserts into said fixed tube housing, which contains a series of integrally molded dipstick wipers through which the dipstick must pass, with provision for wiped fluids to return to the tube housing and reservoir below, and with such cross section as to resist twisting actions within the tube housing; and a cap/dipstick assembly, which engages the wiper plug by means of a short screw thread, and whose construction is such that the dipstick is suspended from the center of the underside of the cap by means of a pivot, enabling the user to engage or disengage the cap without exerting torque on either the wiper plug or the dipstick inserted within it.

3. A self wiping dipstick device, for use in verifying fluid reservoir levels, which requires no separate wiping material, wherein said device employs: a wiper plug, with internal wiping apparatus and provision for wiped fluids to return to a reservoir below, which can be selectively withdrawn or left stationary in a specially designed reservoir access passage; and a cap/dipstick assembly, which engages or disengages said wiper plug by mechanical means, and which is constructed so as to allow for independent movement of the dipstick portion in relation to the cap.

4. The wiper plug of claim 3, wherein the internal wiping apparatus and provision for wiped fluids to return to a reservoir below are comprised by: one or more integrally molded wipers, which are undercut and/or angled downwards to both promote greater surface contact area, and encourage gravity drainage of wiped fluids from the device.

* * * * *